(12) United States Patent
Wiemer

(10) Patent No.: US 7,740,181 B2
(45) Date of Patent: Jun. 22, 2010

(54) METHOD AND DEVICE FOR REGULATING THE TEMPERATURE OF MIXED WATER

(75) Inventor: Horst Wiemer, Kleinmachnow (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 866 days.

(21) Appl. No.: 11/336,013

(22) Filed: Jan. 20, 2006

(65) Prior Publication Data

US 2006/0163372 A1 Jul. 27, 2006

(30) Foreign Application Priority Data

Jan. 25, 2005 (DE) .................... 10 2005 003 451

(51) Int. Cl.
 *G05D 23/185* (2006.01)
 *G05D 23/13* (2006.01)
 *G05D 11/00* (2006.01)
(52) U.S. Cl. .............. 236/12.11; 236/12.12; 236/12.15; 137/88
(58) Field of Classification Search ............... 236/12.11, 236/12.112, 12.15; 137/3, 88, 560
See application file for complete search history.

(56) References Cited

U.S. PATENT DOCUMENTS

| | | | | |
|---|---|---|---|---|
| 4,115,066 A | * | 9/1978 | Muhle | 422/133 |
| 4,420,811 A | | 12/1983 | Tarnay et al. | |
| 4,696,428 A | * | 9/1987 | Shakalis | 236/12.12 |
| 4,768,705 A | * | 9/1988 | Tsutsui et al. | 236/12.12 |
| 4,867,375 A | * | 9/1989 | Ueki et al. | 236/12.12 |
| 4,941,608 A | * | 7/1990 | Shimizu et al. | 236/12.12 |
| 5,032,992 A | * | 7/1991 | Bergmann | 700/285 |
| 5,141,153 A | * | 8/1992 | Jeffress | 236/93 B |

(Continued)

FOREIGN PATENT DOCUMENTS

DE 196 37 610 3/1998

(Continued)

OTHER PUBLICATIONS

International Search Report DE10 2005 003 451.9.

(Continued)

*Primary Examiner*—Chen-Wen Jiang
(74) *Attorney, Agent, or Firm*—James E. Howard; Andre Pallapies

(57) ABSTRACT

A method and a device are provided whereby a container can be continuously filled with mixed water from separate cold and hot water pipes K, W within a short time and the temperature T of the mixed water is kept as constant as possible at a predetermined value $T_s$ during the supply process.

According to the method according to the invention, the regulating process always takes place only in one direction from higher to lower temperature values. The method is implemented by a regulator 1 to 6 with separate intake pipes K and W for cold and hot water and a mechanical control element 6 which is only moved in one direction.

The essential advantage of the method according to the invention is that it can be implemented very cheaply, especially a synchronous motor without reversal of the direction of rotation can be used as a drive for the control member 6. Possible perturbations in the hot water system can by intercepted to a sufficient extent by compensation which is easy to implement.

9 Claims, 1 Drawing Sheet

U.S. PATENT DOCUMENTS

| | | |
|---|---|---|
| 5,439,019 A | 8/1995 | Quandt et al. |
| 5,730,171 A * | 3/1998 | Niakan ........................ 137/98 |
| 6,286,764 B1 * | 9/2001 | Garvey et al. ............ 236/12.12 |
| 6,382,517 B1 | 5/2002 | Bommelaer et al. |
| RE37,888 E * | 10/2002 | Cretu-Petra .............. 236/12.12 |
| 6,499,321 B1 | 12/2002 | Rhodes et al. |
| 6,629,645 B2 | 10/2003 | Mountford |
| 7,040,542 B2 * | 5/2006 | Hugger .................... 236/12.12 |
| 2004/0149831 A1 * | 8/2004 | Sheeran et al. ............. 236/12.1 |
| 2005/0004712 A1 * | 1/2005 | Stevens et al. .............. 700/266 |
| 2005/0098638 A1 * | 5/2005 | Hanna ....................... 236/12.1 |
| 2005/0258258 A1 * | 11/2005 | Jonte ....................... 236/12.15 |

FOREIGN PATENT DOCUMENTS

| | | |
|---|---|---|
| DE | 100 57 263 | 5/2002 |
| EP | 63627 A1 * | 11/1982 |
| EP | 0 259 969 | 3/1988 |
| EP | 0 878 577 | 11/1998 |
| GB | 1 425 326 | 2/1976 |
| GB | 2 262 588 | 6/1993 |
| WO | WO 03/097922 | 11/2003 |

OTHER PUBLICATIONS

Search Report EP 05 11 0806.

* cited by examiner

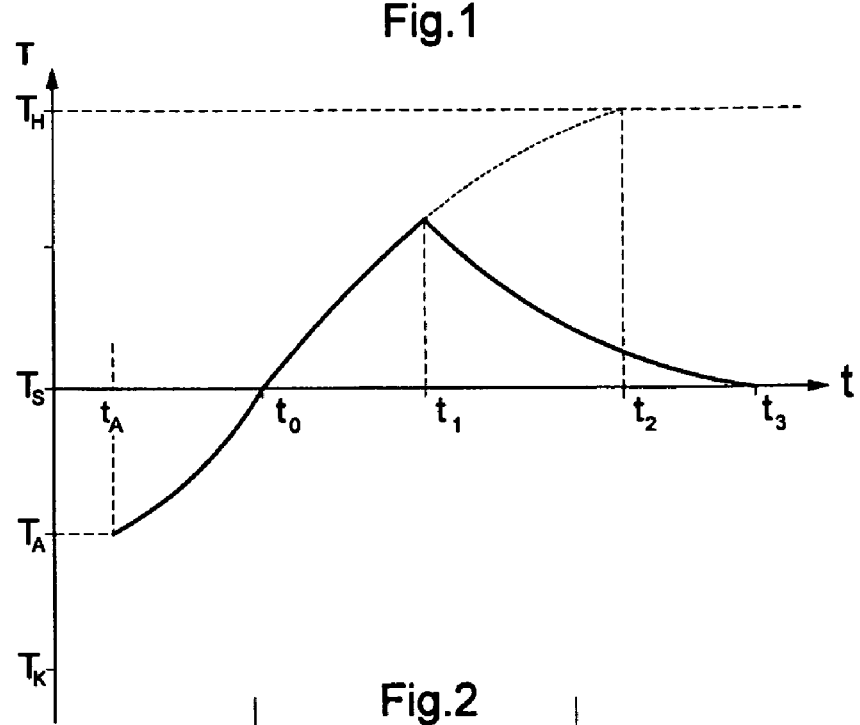
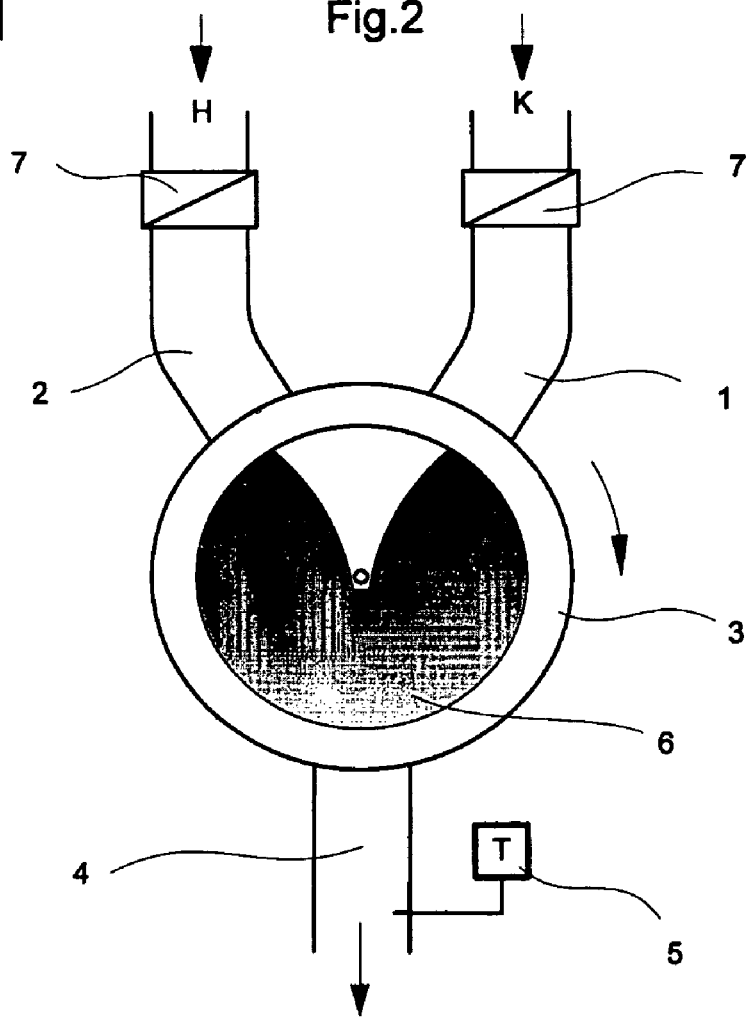

METHOD AND DEVICE FOR REGULATING THE TEMPERATURE OF MIXED WATER

The invention relates to a method for regulating the temperature of mixed water which is supplied separately from separate cold and hot water intakes and a device for implementing the method. The method and device are especially applicable to programme-controlled household appliances such as washing machines and dishwashers.

In order to efficiently utilise the advantages of a central hot water supply in relation to lowering heating costs and shortening the programme duration, appliances have been developed which have one connection each for cold and hot water and control the intake from the two water connections such that the mixed water produced in the reservoir has precisely the desired temperature, for example, the desired 30° C. washing temperature in a soap solution container. The mixed water can be adjusted most simply to a predetermined temperature by means of two programme-controlled check valves disposed in the two intakes. The valves are switched in a time-clocked fashion so that cold and hot water flows in alternately. The mixed water temperature is monitored by means of a thermosensor arranged in the water reservoir, whose measurement data is used to control the valves. This simple method is very inaccurate with regard to the temperature regulation and generally results in an increased water or energy consumption. However, the essential disadvantage is that occasionally water runs in at high temperature. This can have the result that in the case of a washing machine, sensitive textiles are damaged.

Known from DE 197 17 449 A1 is an automatic washing machine wherein the switching valves are controlled by means of thermostats which can be set to different temperatures. The thermostat switches off the hot water valve when the predetermined temperature is exceeded, the cold water valve can be brought into the open position independently of the switching state of the thermostat or it can be controlled independently of the hot water intake. A disadvantage with this solution is that the water intake takes place in several filling steps and afterheating is generally required after the inlet process has ended. The solution described in DE 196 37 610 A1 provides that the valve-controlled cold and hot water intakes should be followed by a mixing compartment in the direction of flow. This compartment functions as an intermediate storage device before the mixed water is fed into the soap solution container. Located in the mixing container is a thermosensor whose measurement data are transferred to the control electronics. This solution variant ensures an intake of mixed water at approximately constant temperatures.

In the methods described the regulation takes place between two temperature levels. The accuracy with which the mixed water temperature can be adjusted depends on how close together are the switching levels. With this type of regulation, the accuracy can only be increased with a higher expenditure of time and considerably increased expenditure on the control and/or the mechanical implementation.

The disadvantage of the known solutions with alternately clocked water intakes can be avoided by using a mechanical control element which regulates the throughputs of cold and hot water by continuously enlarging or reducing in size the two inlet openings. A continuous and therefore rapid water intake can be achieved with this mechanically regulated supply of mixed water. However, the expenditure for this type of regulation is very high, especially for the drive of the control element.

It is the object of the invention to provide a method and a device for implementing the method whereby a container is filled continuously with mixed water from separate cold and hot water intakes within a short time and the temperature of the mixed water is kept as constant as possible during the supply process at a value predetermined by the programme or user. The sequence of the method should be simple and non-sensitive to possible perturbing factors. An important aim of the invention is that the device for implementing the method can be produced in an uncomplicated and inexpensive fashion.

According to the method according to the invention, the regulating process always takes place only in one direction: from higher to lower temperatures. At first, exclusively hot water is supplied, and after the set desired value has been exceeded, the quantity of inflowing hot water is throttled and the supply of cold water is increased continuously. The temperature of the mixed water is regulated downwards until the desired value is reached. The regulating process is completed when the temperature of the incoming hot water no longer increases, that is, has reached the operating temperature of the hot water system and when the temperature of the mixed water has been regulated down to its desired value by the intake of cold water.

The method is implemented by means of a regulator with separate intake pipes for cold and hot water and with a mechanical control member by which means the intake pipes are continuously opened or closed. An important feature of the regulator is that the mechanical control element is only moved in one direction.

At the beginning of the water intake, the hot water pipe is fully opened and the cold water pipe is shut. To regulate the mixed water temperature the control member is set in motion so that the opening of the hot water pipe is continuously closed and that of the cold water pipe is continuously opened. The control element is stopped when the desired temperature is reached. After regulation has been completed, the openings of the intakes are no longer varied, the control member then occupies a position which is retained until the end of the inlet process assuming stable conditions for the water supply.

Thus, there is no need to undertake after-regulation or regulation in intervals between an upper and a lower limiting value. The simple regulating mechanism of the method according to the invention, which only acts in one direction can be achieved using little expenditure on control technology. For practical operation, for example for operation of a washing machine, the parameters attainable with the method are completely sufficient, the water temperature within the soap solution container is adjustable within narrow tolerances and can also be reproduced with sufficient accuracy. The filling of the soap solution container with mixed water can be achieved in a short time since the process according to the invention proceeds without interruption. It is also advantageous that, apart from a short starting phase, the mixed water flows in at almost constant temperature. Damage to temperature-sensitive textiles through contact with too-hot water is eliminated. An important advantage of the method according to the invention is that it can be implemented very inexpensively. In particular, a simple mechanical regulating system can be used which is fitted with a drive without direction reversal.

The invention will be explained hereinafter with reference to an exemplary embodiment shown in the drawing.

In the figures:

FIG. 1 is a temperature/time diagram during filling of a washing machine by the method according to the invention and FIG. 2 is a regulator by which means the method according to the invention can be implemented.

The method sequence according to the invention is described with reference to the diagram designated as FIG. 1. At the same time, for example, reference is made to the operation of a washing machine. The diagram shows the temperature behaviour of the mixed water produced as provided in the method according to the invention. Here $T_H$ is the operating temperature of the hot water system and $T_K$ is the temperature of the cold water which is assumed to be constant. Located between these levels $T_s$ is the desired temperature of the mixed water which is predetermined by the programme or user and is set by means of the method according to the invention.

When hot water is required, for example, for the main washing process of a washing machine, the process begins at the starting time $t_A$ with the maximum possible supply of hot water and the cold water supply simultaneously shut off. In general, the water from the hot water connection will not flow in immediately at the operating temperature $T_H$ of the hot water supply system. The water cools down as a result of discontinuous removal of water and standing for a fairly long time in the domestic water network and flows in initially at a low undefined temperature. According to the example shown in the diagram, the initial temperature of the hot water $T_A$ should lie below the desired value $T_s$. Depending on the length of the supply pipes, their insulation and the frequency of hot water removal, the temperature of the incoming water will only reach the operating temperature $T_H$ of the hot water supply system after a certain time interval. On the time axis of the diagram $t_2$ designates this time. The invention assumes that the temperature of the inflowing water increases continuously until then. The temperature rise is detected by measuring technology and the measured data are supplied to an intelligent evaluation system. Regulation begins when the temperature of the inflowing hot water has reached a value above the predetermined desired value $T_s$.

As a result of the inertia of the system, the beginning of regulation is somewhat delayed. In the diagram this time delay can be read off as the time difference between $t_0$ and $t_1$. An important task in the technical implementation of the method is to keep this time interval between the theoretical earliest possible and the practically feasible time for the beginning of regulation as small as possible.

From the time $t_1$ the hot water supply is continuously throttled by the system and the cold water supply increased continuously. The regulating process is completed when the inflowing hot water has reached the operating temperature $T_H$ and the quantitative flows of cold water and hot water are matched to one another so that the temperature of the mixed water is adjusted to its desired value $T_s$. From this time $t_3$ onwards the quantities of inflowing cold and hot water are kept constant.

FIG. 2 is a schematic diagram showing the regulator for producing mixed water having a predetermined temperature as provided in the method according to the invention. The cylindrical housing 3 of the regulator has two inlet channels 1 and 2, one each for the cold and the hot water connection and one connection 4 for the mixed water to be removed. In the diagram in FIG. 2 the inlet openings are the same size. It can be advantageous to design the inlet for the hot water 2 to be larger to provide a certain compensation for the lower water pressure in the hot water system.

The water guidance inside the mechanical regulator is shown simplified in the drawing, with design details especially those used for rapid mixing of the water flows being dispensed with. The outlet opening 4 is completely opened in the intermediate position of the rotary valve 6. As a result, the mixed water flow can be supplied continuously to its intended location, for example, the soap solution container of a washing machine. A thermosensor 5 is integrated in the regulator housing near the outlet opening or in the outlet connection 4. The arrangement of the thermosensor 5 inside the regulator housing allows the temperature to be recorded directly at the point where the water flows from the cold and hot water pipe 1, 2 are mixed and are led off in a common outflow pipe 4. This has the advantage that the temperature of the mixed water can be recorded as a control variable at a very early time. The inertia of the mechanical regulating system and the possible errors resulting therefrom can thus be minimised.

The mechanical control member 6 is a rotary valve which is fitted into the housing 3 so that it is sealed and is rotatably mounted therein. A synchronous motor not shown in the drawing is used as a drive for the rotary valve 6. As provided in the invention, the rotary valve acting as a control member 6 is only moved in one direction. This is indicated by the arrow in the drawing. The initial state of the water intake is determined by the fact that only the largest possible quantity of hot water runs in. At the beginning of the process the rotary valve 6 occupies a position in which the hot water intake 2 is completely opened and the cold water connection 1 is shut off. If a temperature above the desired value $T_s$ is recorded by the thermosensor 5, the regulation process begins whereby control pulses are generated by means of an intelligent evaluation system which manipulate the control member 6 in such a way that the cold water supply 1 is partially opened with the hot water supply reduced at the same time. For this purpose the rotary valve 6 is set in motion by the drive not shown. The rotary movement of the control member 6 in the direction of the arrow causes a continuous closure of the hot water pipe 2 and at the same time a continuous opening of the cold water intake 1. The rotary valve 6 is stopped when the temperature of the mixed water has reached the predetermined desired value $T_s$. If the temperature continues to increase because the operating temperature $T_H$ is not yet reached at the hot water intake 2, the rotary valve 6 is again set in motion in the direction of the arrow by means of its drive. After reaching the operating temperature at time $t_2$ and the end of regulation at time $t_3$, the openings of the intakes 1 and 2 are no longer varied. The rotary valve 6 is adjusted to a position which remains unchanged until the end of the mixed water supply assuming stable conditions for the water supply.

The regulating process always proceeds only in one direction and when the set desired value is exceeded, the temperature of the mixed water is regulated downwards. For this purpose the rotary valve 6 acting as control member must only be moved in one direction, a reversal of the direction of rotation is not necessary and accordingly a simple synchronous motor can be used as a drive for the rotary valve 6. The opening or closing of the inlet openings 1 and 2 by only one rotary movement of the control member 6 has the effect that the desired temperature for the mixed water can be adjusted in a very short time for mechanical regulators.

In order to improve the operating safety of the method and the regulator implementing this method, in one embodiment of the invention regulation is provided to compensate for possible perturbing factors. In this connection, perturbing factors should be understood as those events and states which can have the result that after the end of the regulated intake according to the invention, the mixed water has not reached the predetermined temperature at its intended location or this lies outside permissible tolerances.

In practice two possible perturbations are particularly important. On the one hand, this relates to the very slow increase in the hot water temperature at the beginning of the intake and on the other hand, the reduction in the mixed water temperature after the regulation has ended (after $t_3$).

A slowed increase in the incoming hot water can have the result that too much under-temperature controlled water is fed in. In order to provide compensation for this, it is provided that the increase in the temperature of the incoming water should be recorded over the time before reaching the desired temperature from $t_A$ to $t_0$. Depending on the measured data obtained, the regulation of the mixing temperature after exceeding the desired temperature $T_H$ is delayed by an internally calculated time interval, i.e. the inertia-dependent time difference $t_1$-$t_0$ which is always present, is lengthened in a computer-controlled fashion to regulate the compensation. In practice it is mostly sufficient to record merely the time before reaching the desired temperature ($t_0$-$t_A$) of the incoming hot water in order to determine the correction value for the delayed regulation therefrom.

It is also considered to be a perturbation if, contrary to the assumption made initially, the temperature of the hot water decreases during the intake. Perturbations of this type can be caused by failures in the external heating system or by defects in the pipes. The case where the pressure in the hot water pipe decreases as a result of temporarily very substantial water removal at various tap positions occurs more frequently. Such a pressure drop then results in a lowering of the mixed water temperature with continued constant pressure in the cold water pipe. Since the mixed water temperature can only be regulated to low values according to the invention, in an embodiment of the invention it is provided to interrupt the process and start anew under initial conditions.

For this purpose the inlet channels 1, 2 are initially closed by means of the two check valves 7, the control member 6 is turned in the direction of the arrow as far as the starting position and the inlet channels 1, 2 are then opened again. The water intake is continued with the cold water connection 1 closed and the hot water intake 2 opened to the maximum. The process then proceeds as described above.

If the collecting container for the mixed water has its own heating, the heating can naturally be switched on alternatively to supply the lacking heat in the mixed water.

The measures described to compensate for perturbations ensure that the process can always be controlled in one direction without after-regulation and the control member need only be moved in one direction for the regulating process. Thus, a synchronous motor without reversal of the direction of rotation can be used in a very simple manner as a drive for the control member.

In order not to run the risk that every brief lowering of the temperature results in an interruption of the intake with a subsequent restarting of the process, a delay time interval is provided which must be exceeded before switch-off takes place. This time interval can be stored fixedly predefined in the memory or it can be calculated by the intelligent evaluation system, taking into account operational parameters such as the magnitude of the temperature drop, the total intake or the flow per unit time.

The other possibility that the temperature or the pressure of the incoming hot water increases once again after adjusting the mixed water temperature to its desired value is not interpreted by the system as a perturbation but as a regulating case which proceeds in the manner described, that is as a downward correction of the mixed water temperature achieved by a corresponding correction movement of the rotary valve 6.

The case where the predetermined desired temperature $T_s$ is not reached by the incoming hot water is likewise not interpreted by the control system as a perturbation. Under these conditions the cold water pipe 1 is shut off over the entire filling process, the filling process proceeds only via the hot water intake 2. The heating of the quantity of water taken into the soap solution container then necessary from the hot water temperature to the desired temperature $T_s$ and the measurement control of the heating take place in a known fashion.

The invention offers the further advantage that possible faults can be intercepted to a sufficient extent by compensation which is easy to achieve. The regulations described to compensate for possible perturbations ensure that the predetermined mixed water temperatures can be maintained with a sufficient tolerance for practice.

The invention claimed is:

1. A method for regulating the temperature (T) of mixed water supplied from separate cold and hot water intakes to bring the mixed water to, and thereafter maintain the mixed water at, a desired mixed water temperature ($T_s$), wherein at the start of the water intake, the regulating system is adjusted so that the cold water intake is shut off and the hot water intake is completely opened, and that during the water intake, when the temperature of the hot water supplied from the hot water intake exceeds the desired mixed water temperature ($T_s$) at which the mixed water is to be maintained, the mixed water temperature (T) is regulated such that the quantity of inflowing water is decreased and the cold water intake is partially increased and that on reaching the desired temperature ($T_s$) in the mixed water, the quantities of the two incoming partial streams are kept constant, wherein when the temperature falls below the set desired temperature ($T_s$) in the mixed water, the intake of cold and hot water (K, W) is stopped and the regulating process is then started anew under initial conditions i.e, with maximum hot water intake and shut-off cold water intake.

2. The method according to claim 1, wherein the increase in the temperature (T) of the incoming hot water over the time ($t_3$-$t_A$) before reaching the desired temperature ($T_S$) is recorded by the regulating system and wherein, depending on this value, the regulation of the mixing temperature after exceeding the desired temperature ($T_S$) is delayed by an internally calculated time interval.

3. The method according to claim 1, wherein the time ($t_3$-$t_A$) before reaching the desired temperature ($T_S$) of the incoming hot water is recorded by the regulating system and wherein, depending on this value, the regulation of the mixing temperature after exceeding the desired temperature ($T_S$) is delayed by an internally calculated time interval.

4. The method according to claim 1, wherein the stopping and subsequent restarting of the regulating process is delayed by at least one of a time interval fixedly stored in the program memory and by a time interval which is calculated taking into account operational parameters such as at least one of a magnitude of the temperature drop, total intake, and flow per unit time.

5. A method for substantially maintaining the temperature of mixed water supplied from separate cold and hot water intakes into a water bearing household appliance at a desired mixed water temperature, the method comprising:

during a first inflow period, supplying water from the hot water intake into the water bearing household appliance while regulating the cold water intake to substantially preclude a supply of water from the cold water intake into the water bearing household appliance, whereupon water is supplied into the water bearing household appliance solely from the hot water intake;

during the first inflow period, monitoring the temperature of the water supplied into the water bearing household appliance solely from the hot water intake to determine if the temperature of such water supplied solely from the hot water intake exceeds the desired mixed water temperature at which the supply of mixed water is to be maintained;

when the temperature of water supplied solely from the hot water intake during the first inflow period exceeds the desired mixed water temperature, commencing a supplying of water from the cold water intake, the supplying of water from the cold water intake and the supplying of water from the hot water intake forming, at the time of the commencing a supplying of water from the cold water intake, a mixed supply of water having a first mixed temperature;

once the supplying of water from the cold water intake has commenced, regulating the supplying of water from the cold water intake and the supplying of water from the hot water intake to increase the temperature of the mixed supply of water from its first mixed temperature to the desired mixed water temperature;

once the desired mixed water temperature is reached, regulating the supplying of water from the cold water intake and the supplying of water from the hot water intake to maintain the mixed supply of water at substantially the desired mixed water temperature; and when a temperature of the mixed supply of water falls below the desired mixed water temperature, stopping the regulating of the supplying of water from the cold water intake and the supplying of water from the hot water intake and restarting the temperature regulating process with the cold water intake shut off and the hot water intake open.

6. The method according to claim 5, further comprising:

recording an increase in the temperature of the incoming hot water supplied from the hot water intake before reaching the first mixed temperature;

calculating a time interval in response to an increase in temperature of the incoming hot water supplied from the hot water intake; and delaying the time of the commencing a supplying of water from the cold water intake by the time interval.

7. The method according to claim 5, further comprising:

recording a period of recorded time before reaching the first mixed temperature;

calculating a time interval as a function of the period of recorded time; and delaying the time of the commencing a supplying of water from the cold water intake by the time interval.

8. The method according to claim 5, wherein a stopping and subsequent restarting of the regulating process is delayed by a time interval stored in a program memory.

9. The method according to claim 5, wherein the stopping and subsequent restarting of the regulating process is delayed by a time interval which is calculated by the regulating system taking into account operational parameters including at least one of a magnitude of the temperature drop, total intake, and flow per unit time.

* * * * *